(12) United States Patent
Iizuka et al.

(10) Patent No.: US 6,526,933 B2
(45) Date of Patent: Mar. 4, 2003

(54) MULTI-CYLINDER INTERNAL COMBUSTION ENGINE

(75) Inventors: Yoshiaki Iizuka, Saitama (JP); Takeshi Hagiwara, Saitama (JP); Toshio Abe, Saitama (JP); Makoto Suzuki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/145,105

(22) Filed: May 15, 2002

(65) Prior Publication Data

US 2002/0170522 A1 Nov. 21, 2002

(30) Foreign Application Priority Data

May 15, 2001 (JP) ......................................... 2001-144947

(51) Int. Cl.[7] ............................ F02F 1/24; F02M 35/10; F02P 13/00; F02B 77/00
(52) U.S. Cl. ................................ 123/193.5; 123/184.24
(58) Field of Search ............. 123/193.5, 184.21–184.61

(56) References Cited

U.S. PATENT DOCUMENTS

| | | | |
|---|---|---|---|
| 4,970,994 A | * 11/1990 | Sawada et al. | 123/184.24 |
| 5,088,454 A | * 2/1992 | Washizu et al. | 123/184.24 |
| 5,205,244 A | * 4/1993 | Nakamura et al. | 123/184.24 |
| 5,653,201 A | * 8/1997 | Hosoya | 123/184.34 |

FOREIGN PATENT DOCUMENTS

JP 10-176543 6/1998

\* cited by examiner

Primary Examiner—Marguerite McMahon
(74) Attorney, Agent, or Firm—Arent Fox Kintner Plotkin & Kahn, PLLC

(57) ABSTRACT

A multi-cylinder internal combustion engine includes an intake manifold having branch pipes connected to one side of a cylinder head and curved to allow the intake manifold to extend to directly above a cylinder-head cover, and intake-side spark plugs and fuel injectors which are incorporated in the cylinder head. The spark plugs are disposed outside a valve train chamber on a side of the valve train chamber where curved portions of the branch pipes are disposed, and the fuel injectors and ignition coils provided above the spark plugs are disposed between the valve train chamber and the curved portions in a direction normal to axes of the cylinders as viewed from a direction in which cylinders are arranged. The ignition coils are disposed so as not to overlap the branch pipes as viewed from a direction in which the ignition coils are attached to the cylinder head.

7 Claims, 4 Drawing Sheets

MULTI-CYLINDER INTERNAL COMBUSTION ENGINE

BACKGROUND OF THE INVENTION

1. Field of the Invention

The present invention relates to a construction in which spark plugs, ignition coils and fuel injectors are arranged in a multi-cylinder internal combustion engine with an intake manifold having branch pipes connected to one side of a cylinder head and curved on the one side of the cylinder head to thereby allow the manifold to extend to directly above a cylinder-head cover.

2. Description of the Related Art

Conventionally, in order to achieve a compact arrangement of an intake manifold, there has been proposed a multi-cylinder internal combustion engine in which branch pipes of an intake manifold are curved to thereby allow the intake manifold to extend to directly above a cylinder-head cover, and an example thereof is disclosed in JP-A-10-176543. In this disclosed internal combustion engine, the intake manifold which is connected to a side of a cylinder head is curved at a side of the cylinder-head cover to extend upwardly, and is connected to a surge tank provided directly above the cylinder-head cover. The surge tank is then disposed directly above ignition coils which are provided at a substantially central location on the cylinder-head cover in a direction normal to a direction in which cylinders are arranged as viewed from a direction of axes of the cylinders.

Incidentally, in the prior art, the ignition coils are provided at the central location of the cylinder-head cover, and moreover, the surge tank is disposed directly above the ignition coils so disposed. Therefore, the surge tank is positioned higher over the cylinder-head cover by such an extent that the ignition coils protrude upwardly from the cylinder-head cover along the axes of the cylinders, thereby causing a problem that the overall height of the internal combustion engine is so increased. In addition, servicing the ignition coils requires the removal of the surge tank, thereby causing another problem that the efficiency of servicing work is deteriorated.

SUMMARY OF THE INVENTION

The invention was made in view of these situations, and a common object of first to fourth aspects of the invention is to provide a compact multi-cylinder internal combustion engine by maintaining as low as possible in a direction of axes of cylinders the height of a multi-cylinder engine in which an intake manifold is allowed to extend to directly above a cylinder-head cover. Furthermore, an object of the second and fourth aspects of the invention is to improve the workability in servicing the ignition coils.

An object of the third aspect of the invention is to provide a multi-cylinder internal combustion engine which is made compact in the cylinder arrangement direction.

According to the first aspect of the invention, there is provided a multi-cylinder internal combustion engine comprising a cylinder head attached to the top of a cylinder block in which a plurality of cylinders are formed, a cylinder-head cover attached to the top of the cylinder head, an intake manifold having a plurality of branch pipes connected to one side of the cylinder head:and curved on the one side of the cylinder head to thereby allow the intake manifold to extend to directly above the cylinder-head cover, a valve train chamber formed by the cylinder head and the cylinder-head cover and spark plugs and fuel injectors respectively incorporated in the cylinder head, the multi-cylinder internal combustion engine being characterized in that the spark plugs are disposed outside the valve train chamber on a side of the valve train chamber where curved portions of the plurality of branch pipes are disposed, and in that the fuel injectors and ignition coils that are provided above the spark plugs are disposed between the valve train chamber and the curved portions of the plurality of branch pipes in a direction normal to axes of the cylinders as viewed from a direction in which the cylinders are arranged.

According to the construction of the first aspect of the invention, the following advantages are provided. Namely, since the spark plugs are disposed outside the valve train chamber and on the side of the valve train chamber where the curved portions of the branch pipes are disposed, the spark plugs can easily be attached to or detached from the cylinder head. Moreover, since the fuel injectors and ignition coils are disposed between the valve train chamber and the curved portions of the branch pipes in the direction normal to the axes of the cylinders as viewed from the cylinder arrangement direction, the ignition coils are in no case positioned directly above the cylinder-head cover and therefore the intake manifold can be disposed closer to the cylinder-head cover in the direction of the axes of the cylinders, so that the dimension of the internal combustion engine can be reduced in the cylinder-axis direction by the extent that the intake manifold is disposed closer to the cylinder-head cover, whereby the internal combustion engine can be made compact in the cylinder-axis direction. Moreover, it also contributes to the accomplishment of the compact internal combustion engine to make use of the space formed by the curved portions of the branch pipes in the direction normal to the cylinder-axis direction for the disposition of the fuel injectors and ignition coils.

According to the second aspect of the invention, there is provided a multi-cylinder internal combustion engine as set forth in the first aspect of the invention, wherein the ignition coils are disposed in such a manner that the ignition coils do not overlap the branch pipes respectively as viewed in a direction in which the ignition coils are attached to or detached from the cylinder head.

According to the construction of the second aspect of the invention, in addition to the advantages provided by the first aspect of the invention, the following advantage is provided. Namely, since the ignition coils are disposed in such a manner that the ignition coils do not overlap the branch pipes respectively as viewed in a direction in which the ignition coils are attached to or detached from the cylinder head, in servicing the ignition coils, the ignition coils can be detached from and then attached to the cylinder head without removing the intake manifold, thereby improving the workability in servicing the ignition coils.

According to the third aspect of the invention, there is provided a multi-cylinder internal combustion engine as set forth in the first or second aspect of the invention, wherein the ignition coils are disposed, respectively, by one side of portions of the branch pipes whose outside diameters in the direction in which the cylinders are arranged are made smaller.

According to the construction of the third aspect of the invention, in addition to the advantages provided by the cited aspects of the invention, the following advantage is provided. Namely, since the ignition coils are disposed, respectively, by one side of portions of the branch pipes whose outside diameters in the direction in which the cylinders are arranged are made smaller, the total width for each cylinder in the cylinder arrangement direction which includes the ignition coil and the branch pipe is reduced, whereby the cylinder head can be made compact in the cylinder arrangement direction.

According to the fourth aspect of the invention, there is provided a multi-cylinder internal combustion engine as set forth in any of the first to third aspects of the invention, wherein the ignition coils each have a mounting portion to the cylinder-head cover and a connecting portion where a connecting terminal is connected for supplying electric current, and wherein the connecting portion is disposed in such a manner that the connecting portion does not overlap the branch pipe as viewed in a direction in which the connecting terminal is attached to or detached from the cylinder-head cover and is located on an opposite side of the ignition coil to a side thereof where the mounting portion is provided as viewed in the direction in which the connecting terminal is attached to or detached from the cylinder-head cover.

According to the construction of the fourth aspect of the invention, in addition to the advantages of the cited aspects of the invention, the following advantage is provided. Namely, since the ignition coils are disposed between the valve train chamber and the curved portions of the branch pipes in the direction normal to the axes of the cylinders as viewed from the cylinder arrangement direction, and since the connecting portion is disposed in such a manner that the connecting portion does not overlap the branch pipe as viewed in the direction in which the connecting terminal is attached to or detached from the cylinder-head cover and is located on an opposite side of the ignition coil to a side thereof where the mounting portion is provided as viewed in the direction in which the connecting terminal is attached to or detached from the cylinder-head cover, in any case there is provided no disturbance by the branch pipes and the cylinder head in attaching and detaching the connecting terminals to and from the connecting portions of the ignition coils, so that the attachment and detachment of the connecting terminals to and from the connecting portions of the ignition coils is facilitated, thereby improving the workability in detaching and attaching the connecting terminals from and to the ignition coils in servicing the same.

DETAILED DESCRIPTION OF THE PREFERRED EMBODIMENTS

An embodiment according to the invention will be described below with reference to FIGS. 1 to 4.

Figure 1:
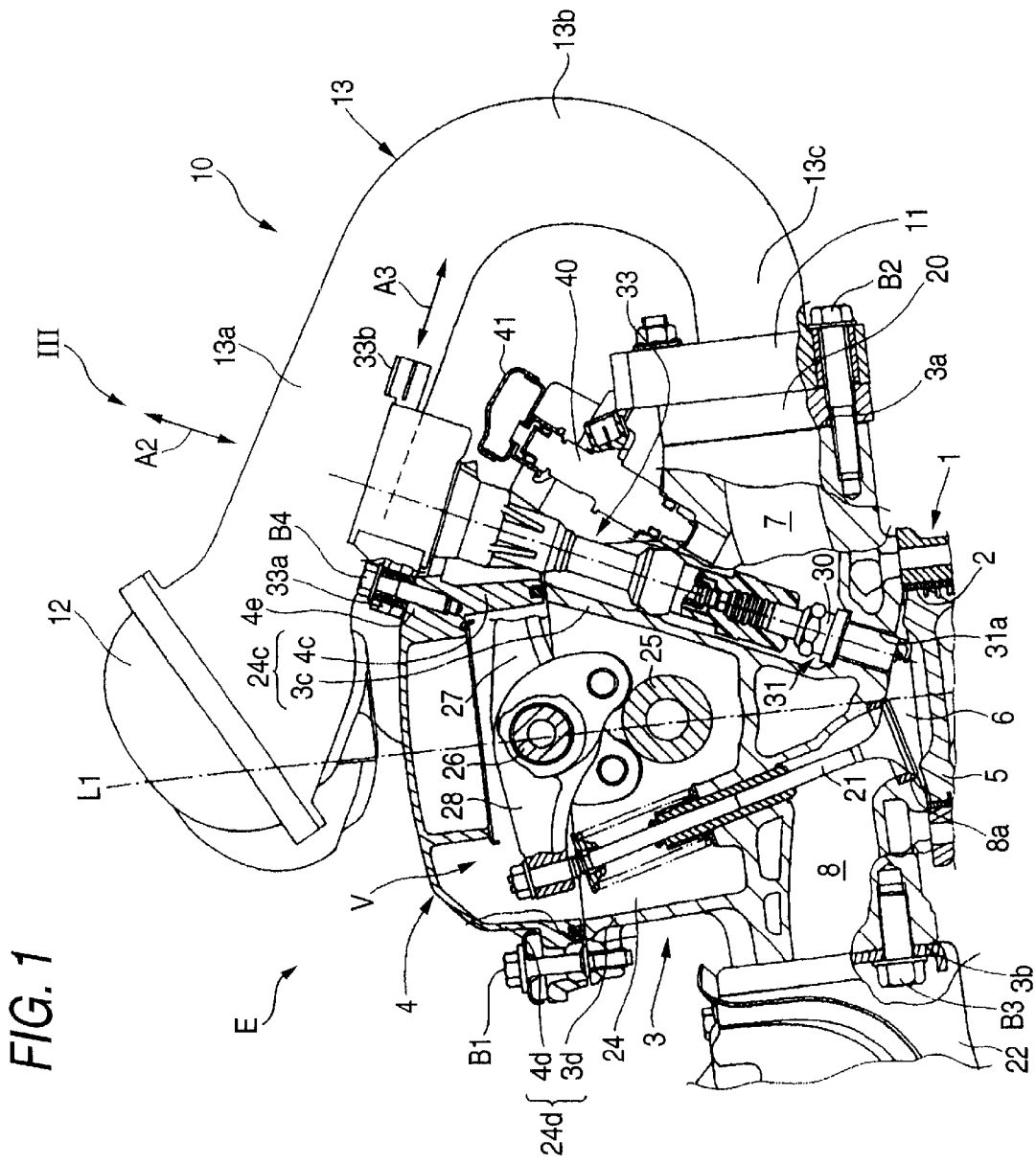
FIG. 1 is a cross-sectional view of a multi-cylinder internal combustion engine according to an embodiment of the invention taken along a plane normal to a direction in which cylinders are arranged.
Figure 2:
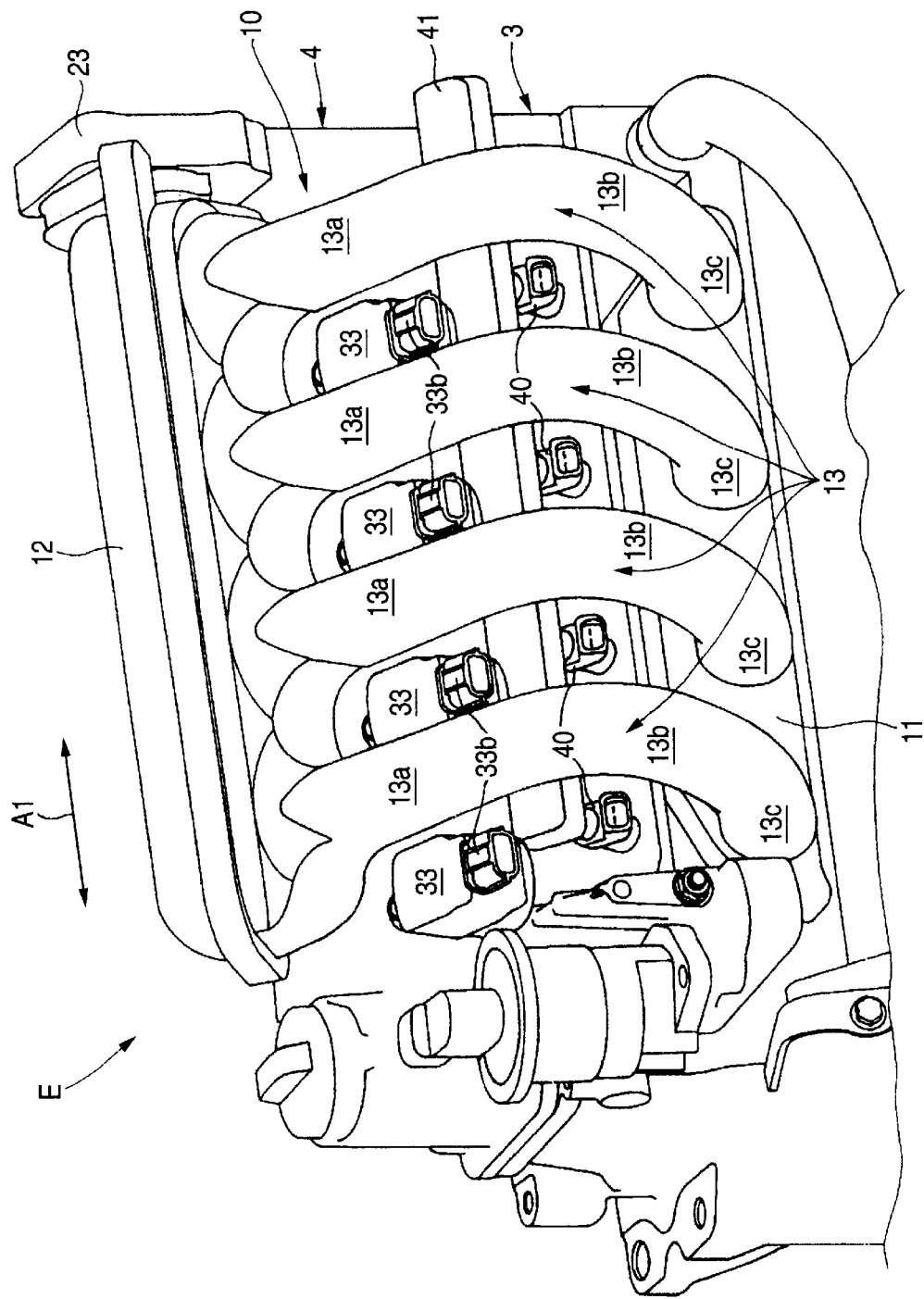
FIG. 2 is a perspective view of the multi-cylinder engine shown in FIG. 1.

Referring to FIGS. 1 and 2, a multi-cylinder internal combustion engine E to which the invention is applied is an in-line, four-cylinder, four-cycle internal combustion engine for an FF (front-mounted engine and front-wheel drive) type vehicle. The engine E is mounted transversely on a body of the vehicle with a crankshaft thereof (not shown) being directed in a transverse direction. Four cylinders 2 are formed in a cylinder block 1 of the internal combustion engine E, and a cylinder head 3 is joined to the top of the cylinder block with a plurality of bolts (not shown). In addition, a valve cover or cylinder-head cover 4 is jointed, in turn, to the top of the cylinder head 3 with a plurality of bolts B1. In the cylinder head 3, combustion chambers 6 are formed at positions facing pistons 5 which are slidably fitted in the respective cylinders 2, and the pistons 5 adapted to be driven in a reciprocating fashion by combustion pressures drives and rotates the crankshaft.

Note that when used in this embodiment a term "longitudinally and transversely" means "longitudinally and transversely" of a vehicle used as reference. For example, in FIG. 1, the right hand of the FIG. faces the front of the vehicle whereas the left hand thereof faces the rear of the vehicle.

An intake port 7 and an exhaust port 8 are formed in the cylinder head 3 for each cylinder 2, which are each adapted to communicate with the combustion chamber 6. Each intake port 7 has an intake valve port 7a and an inflow port. The intake valve port 7a (refer to FIG. 4) opens into the combustion chamber 6 and is opened and closed by an intake valve (not shown). The inflow port opens into a side 3a of the cylinder head 3 which is located on a front side being one side of the cylinder head 3, that is, an intake side of the cylinder head 3 relative to an imaginary plane including a cylinder axis L1 of each cylinder 2. Then, an intake manifold 10 which constitutes an intake passage is joined to the side 3a of the cylinder head 3 via an insulator 20 at a flange 11 with a plurality of bolts B2, whereby the intake port 7 and the intake passage are made to communicate with each other. On the other hand, the exhaust port 8 has an exhaust valve port 8a and an outflow port. The exhaust valve port 8a opens into the combustion chamber 6 and is opened and closed by an exhaust valve 21. The outflow port opens into a side 3b of the cylinder head 3 which is located on the other side or a rear or exhaust side thereof relative to the imaginary plane. Then, an exhaust manifold 22 which constitutes an exhaust passage is joined to the side 3b of the cylinder head 3 with a plurality of bolts B3, whereby the exhaust port 8 and the exhaust passage are made to communicate with each other.

As is shown in FIG. 1, the intake manifold 10 extends from the side 3a of the cylinder head 3 and is then curved upwardly ahead of the cylinder head 3 or on the one side of the cylinder head 3 to thereby allow the intake manifold 10 to extend to directly above the cylinder-head cover 4. The intake manifold 10 includes an air collecting tube 12 and four branch pipes 13. The air collecting tube 12 is located directly above the cylinder-head cover 4 and constitutes an intake upstream portion of the intake manifold 10. The four branch pipes 13 branch from the air collecting tube 12 and connect to the cylinder head 3 via the flange 11 and the insulator 20 to communicate with the four intake ports 7 at downstream ends thereof, respectively.

Figure 3:
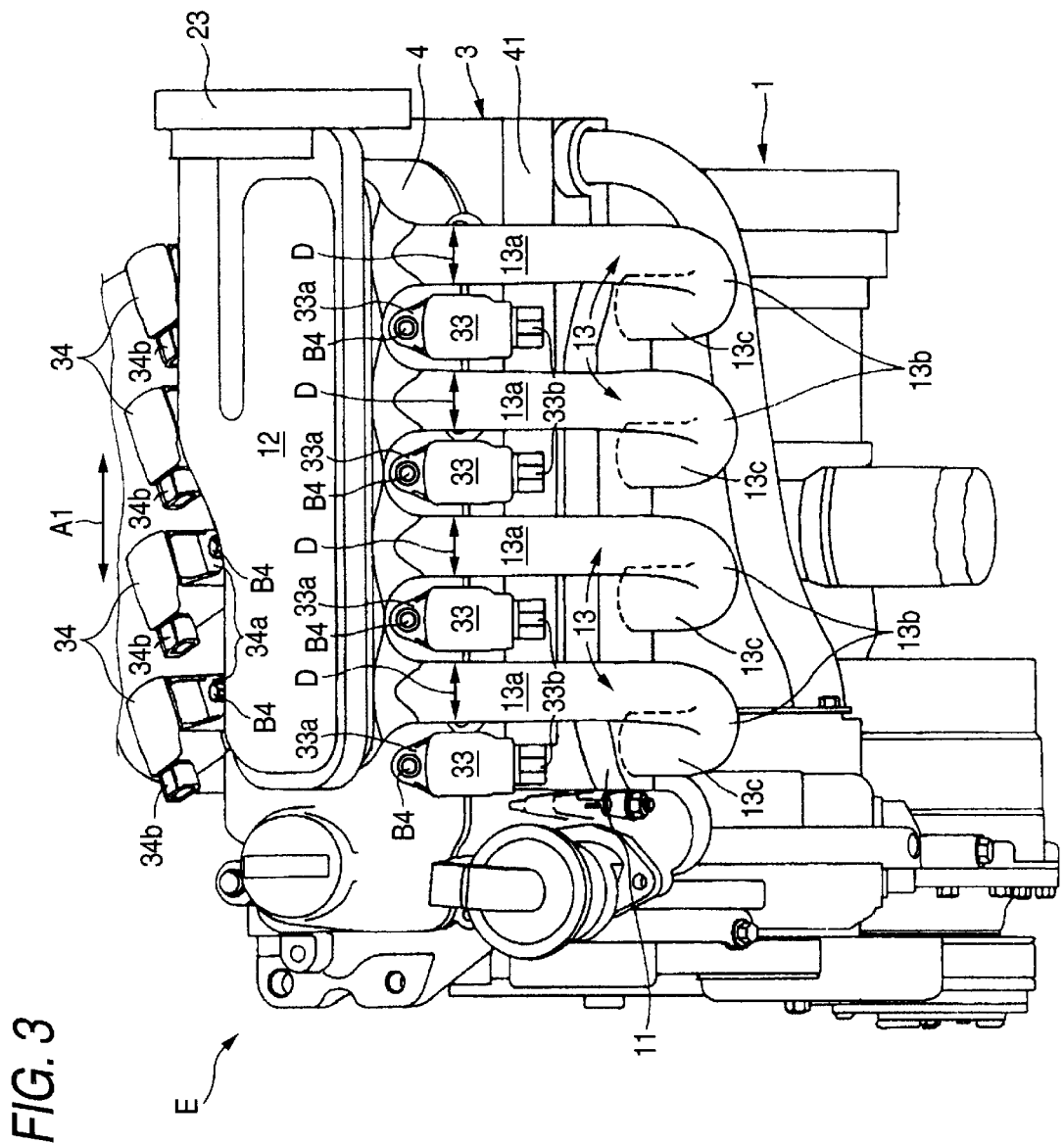
FIG. 3 is a view as seen in a direction indicated by an arrow III in FIG. 1.

Referring also to FIG. 3, a throttle body 23 in which a throttle valve is incorporated is connected to a left end of the air collecting tube 12 which extends in a direction A1 in which the cylinders are arranged, and the throttle body 23 then communicates with an air cleaner (not shown). The four branch pipes 13 are arranged in the cylinder arrangement direction A1 at substantially equal intervals. Each branch pipe 13 has a primary linear portion 13a which is located on the intake upstream side and extends from the air collecting tube 12 linearly forward and downward in an inclined fashion, a curved portion 13b which continues to the primary linear portion 13a and is curved into a U-shape on the side of the cylinder head 3 which is ahead thereof and a secondary linear portion 13c which is located on a downstream side of the intake manifold 10 and which continues to the curved portion 13b and extends linearly to the rear in a substantially horizontal fashion to reach the flange 11.

Furthermore, the outside diameter of each branch pipe 13 in the cylinder arrangement direction A1 is set such that the outside diameter is small at the primary linear portion 13a and then increases as the branch pipe 13 extends towards the secondary linear portion 13c via the curved portion 13b. On the other hand, when looking at the cross section of the passage of each branch pipe 13, the outside diameter of the branch pipe 13 in a direction normal to the cylinder arrangement direction A1 is, as shown in FIG. 1, set such that the outside diameter is large at a position closer to an intake upstream portion of the primary linear portion 13a and then decreases as the branch pipes extends closer to a downstream portion of the primary linear portion 13a and further toward the curved portion 13b and the secondary linear portion 13c.

Referring to FIG. 1, valve trains V are accommodated in a valve train chamber 24 formed by the cylinder head 3 and the cylinder-head cover 4 which each valve train opens and closes the intake valve and the exhaust valve 21 at predetermined opening and closing timings and lift amounts in synchronism with the rotation of the crankshaft. The valve train V comprises a camshaft 25 which is rotatably supported on the cylinder head 3 in such a manner as to be driven to rotate by the power from the crankshaft, and an intake rocker arm 27 and an exhaust rocker arm 28 which are pivotally supported on a rocker shaft 26 which is fixed to the cylinder head 3 in such a manner as to be brought into abutment with the intake valve and the exhaust valve 21, whereby the rocker arms 27, 28 which are rocked by cams provided on the camshaft 25 open and close the intake valve and the exhaust valve 21, respectively.

A side wall 24c of the valve train chamber 24 on an intake side thereof is constituted by a side wall 3c of the cylinder head 3 which is located on the intake side thereof and extends upwardly and a side portion 4c of the cylinder-head cover 4 which is located on a front side (an intake side) thereof relative to the imaginary plane. A side wall 24d of the valve train chamber 24 on a rear side thereof is constituted by a side wall 3d of the cylinder head 3 which is located on the exhaust side thereof and extends upwardly and a side portion 4d of the cylinder-head cover 4 which is located on a rear side (an exhaust side) thereof relative to the imaginary plane.

Figure 4:
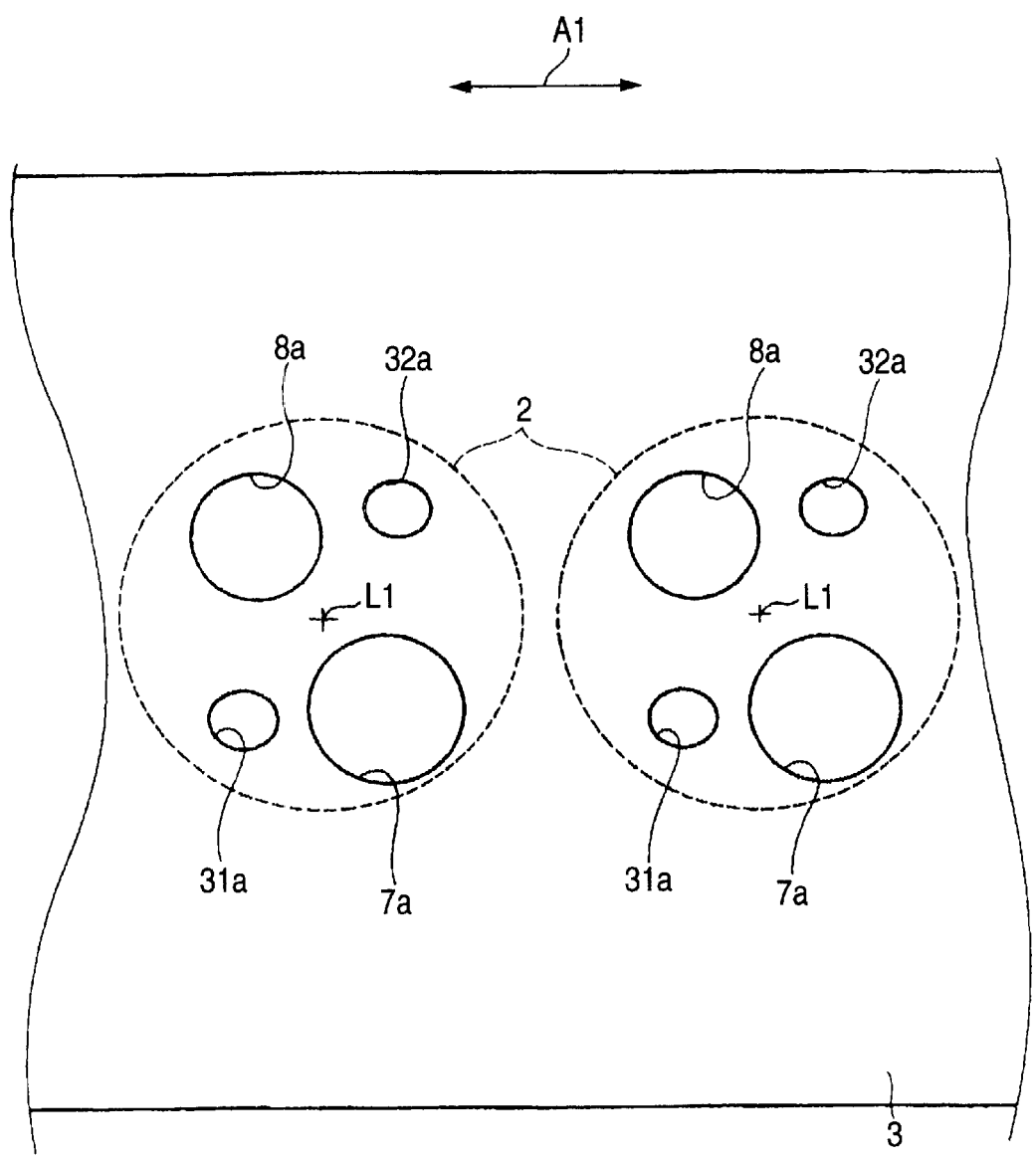
FIG. 4 is a plan view of a cylinder head for describing an exemplary layout of an intake valve, an exhaust valve and spark plug mounting holes.

In addition, two mounting portions where two spark plugs facing the combustion chamber 6 are mounted, respectively, are provided outside the valve train chamber 24 for each cylinder 2 (in FIG. 1, only an intake side spark plug 30 and the mounting portion 31 are disclosed) in such a manner as to be positioned adjacent to the intake port 7 and the exhaust port 8, respectively, in the cylinder arrangement direction A1 (or in the transverse direction). In other words, referring also to FIG. 4, provided for each cylinder 2 are the mounting portion 31 positioned adjacent to the intake port 7 having the intake valve port 7a on the right-hand side thereof and having a mounting hole 31a into which the spark plug 30 is screwed and the mounting portion 32 having a mounting hole 32a into which the spark plug on the exhaust side is screwed whereas the mounting portion 32 is positioned adjacent to the exhaust port 8 having the exhaust valve port 8a on the left-hand side thereof, where by the respective spark plugs are screwed into the cylinder head 3. Thus, as viewed from the direction of the axis L1 of the cylinder, the intake valve port 7a and the exhaust valve port 8a, and the mounting hole 31a for the intake side spark plug 30 and the mounting hole 32a for the exhaust side spark plug are disposed, respectively, substantially symmetrically relative to the axis L1 of the cylinder in each combustion chamber 6.

Then, as shown in FIG. 1, an ignition coil 33 which is formed integrally with a plug cap is disposed above each intake-side spark plug 30 which is disposed on the side of the valve train chamber 24 which faces the curbed portion 13b of the branch pipe 13. The spark plug 30 and the ignition coil 33 incline together along the side wall 24c of the valve train chamber 24 which inclines from the combustion chamber 6 side toward the cylinder-head cover 4 side to be closer to the curved portion 13b. Each ignition coil 33 is positioned so as to be closer to the cylinder head 3 than the air collecting chamber 12. Moreover, the ignition coil 33 is disposed by one side of the primary linear portion 13a or, in this embodiment, rightward of the primary linear portion 13a of the branch pipe 13 which connects to the intake port 7 which communicates, in turn, with the combustion chamber 6 in each combustion chamber 6 in such a manner as to be adjacent to the primary linear portion 13a in the cylinder arrangement direction A1. Therefore, the remaining three ignition coils 33 except for the ignition coil 33 located at the right end are disposed between the four branch pipes 13, respectively, in the cylinder arrangement direction A1.

Furthermore, as shown in FIG. 3, each ignition coil 33 is disposed such that the entirety of the ignition coil 33 does not overlap the branch pipe 13 as viewed from a direction A2 (refer to FIG. 1) in which the ignition coil 33 is attached to or detached from the spark plug 30, which direction coincides with a central axis L2 of the mounting hole 31a which inclines forward as it extends upwardly, that is, the direction of the central axis L2 coinciding, in turn, with a direction in which the spark plug 30 is attached to or detached from the cylinder head 3.

Formed on an upper portion of each ignition coil 33 are a mounting portion 33a having a through hole through which a bolt B4 is passed which is used to fasten the ignition coil 33 to the cylinder-head cover 4 and a coupler 33b which is a connecting portion where a connecting terminal is connected which is used to supply electric current to a primary coil of the ignition coil 33. The mounting portion 33a which is provided at the rear of the ignition coil 33 in such a manner as to protrude to the rear to approach the cylinder-head cover 4 is fastened by the bolt B4 in a direction parallel to the direction A2 in which the ignition coil 33 is attached to or detached from the spark plug 33 to a mounting seat 4e having a threaded hole. The mounting seat 4e is formed at a thick portion of the cylinder-head cover 4 which is an upper portion of the side portion 4c of the cylinder-head cover 4 and is made thicker than the other portions of the cylinder-head cover 4 to become more rigid than the other portions. In addition, the coupler 33b which is provided at the front of the ignition coil 33 in such a manner as to protrude to the front to move away from the cylinder-head cover 4 is disposed such that the coupler 33b does not overlap the branch pipe 13 as viewed from a direction A3 (refer to FIG. 1) in which the connecting terminal is attached or detached so that the insertion and removal of the connecting terminal can be implemented from the front. The mounting portion 33a is situated on an opposite side of the ignition coil 33 to a side thereof where the coupler 33b is situated as viewed from the direction A3 in which the connecting terminal is attached or detached.

Thus, since the ignition coil 33 inclines forward as it extends upwardly, they become extremely easy to be visualized in a state in which the internal combustion engine E is installed on a front side of the vehicle. Furthermore, since the ignition coils 33 are situated at the position where air permitted to flow in from the front of the vehicle while the vehicle is running is allowed to be applied to the ignition coils 33 without being disturbed by the branch pipes 13, the ignition coils 33 are cooled effectively by the air so applied thereto.

On the other hand, an ignition coil 34 for the spark plug on the exhaust side is also formed integrally with a plug cap, and a mounting portion 34a and a coupler 34b are formed at an upper portion of the ignition coil 34. The mounting portion 34a is fastened with a bolt B4 to a mounting seat formed at a thick portion of the cylinder-head cover 4. The coupler 34b is formed such that the insertion and removal of the connecting terminal can be attained from a rightwardly inclined front portion.

In addition, referring to FIGS. 1 and 2, a fuel injector 40 for injecting fuel toward each intake valve port 7a to form air-fuel mixture for combustion is incorporated in the cylinder head 3 above each intake port 7 for each combustion chamber 6 in such a manner that the fuel injector 40 inclines forward as it extends upwardly. Each fuel injector 40 is disposed in a space formed by the curved portion 13a of the branch pipe 13 and the side wall 24c of the valve train chamber 24 in such a manner as to overlap the branch pipe 13 as viewed from any direction within a range ranging from the top to the front via the direction A2 in which the ignition coil 33 is attached to or detached from the spark plug 30 and occupies a position where the ignition coil 33 is disposed between the sidewall 24c and the fuel injector 40 in a direction normal to the cylinder axis L1 (or the imaginary plane) or in a longitudinal direction in this embodiment, as viewed from the cylinder arrangement direction A1. As a result, the fuel injector 40 and the ignition coil 33 are disposed between the valve train chamber 24 and the curved portion 13b of the branch pipe 13 in the normal direction as viewed from the cylinder arrangement direction A1.

Then, a delivery pipe 41 for supplying fuel to the fuel injectors 40 is provided in such a manner as to extend in parallel to the cylinder arrangement direction A1 in the space formed between the four branch pipes 13 and the side wall 24c by making use of the fact that the fuel injector 40 inclines from the imaginary plane toward the curved portion 13b at an inclination angle which is greater than the inclination angle of the ignition coil 33 as viewed from the cylinder arrangement direction A1, whereby the delivery pipe 41 is connected to upper portions of the respective fuel injectors 40. Then, as viewed from a direction in which the vehicle runs, the ignition coils 33 are located higher than the delivery pipe 41 in the direction of the axes L1 of the cylinders.

Next, the function and effectiveness of the embodiment constructed as described heretofore will be described.

Since the spark plugs 30 are disposed outside the valve train chamber 24 and on the side of the valve train chamber 24 where the curved portions 13b of the branch pipes 13 are disposed, the spark plugs 30 can easily be attached to or detached from the cylinder head 3. Moreover, since the fuel injectors 40 and ignition coils 33 are disposed between the valve train chamber 24 and the curved portions 13b of the branch pipes 13 in the normal direction as viewed from the cylinder arrangement direction A1, the ignition coils 33 are in no case positioned directly above the cylinder-head cover 4 and therefore the intake manifold 10 can be disposed closer to the cylinder-head cover 4 in the direction of the axes L1 of the cylinders, so that the dimension of the internal combustion engine E in the direction of the axes L1 of the cylinders or the overall height thereof can be reduced by the extent that the intake manifold 10 is disposed closer to the cylinder-head cover 4, whereby the internal combustion engine E can be made compact in the vertical direction. Moreover, since the fuel injectors 40 and the ignition coils 33 are disposed by making use of the space formed in the normal direction by the curved portions 13b of the branch pipes 13 the internal combustion engine E can be made compact in this respect.

In addition, since the fuel injectors 40 which are disposed between the side wall 24c of the valve train chamber 24 and the curved portions 13b in the normal direction as viewed from the cylinder arrangement direction A1 incline from the imaginary plane toward the curved portions 13b at the inclination angle which is greater than the inclination angle of the ignition coils 33, the delivery pipe 41 for supplying fuel to the fuel injectors 40 can be disposed by making use of the space between the four branch pipes 13 and the side wall 24c, whereby the compact arrangement of the delivery pipe 41 can be attained. Moreover, the delivery pipe 41 and the fuel injectors 40 are protected against the contact and interference with other members by the branch pipes 13 which are situated from the top to the front thereof.

Since the ignition coils 33 are disposed in such a manner that the ignition coils 33 do not overlap the branch pipes 13, respectively, as viewed in the direction A2 in which the ignition coils 33 are attached to or detached from the cylinder head 3, in servicing the ignition coils 33, the ignition coils 33 can be detached from and then attached to the cylinder head 3 without removing the intake manifold 10, thereby improving the workability in servicing the ignition coils 33. Furthermore, since the spark plugs 30 are also attached to or detached from the cylinder head 3 in the attachment or detachment direction A2, the workability in servicing the spark plugs 30 as well as the ignition coils 33 can be improved. In addition, since the ignition coils 33 and the spark plugs 33 incline forward as they extend upwardly, they become extremely easy to be visualized in the state in which the internal combustion engine E is installed on the front side of the vehicle, and hence the attachment and detachment of the ignition coils 33 and the spark plugs 30 can be facilitated.

Additionally, since the ignition coils 33 are situated at the position where air permitted to flow in from the front of the vehicle while the vehicle is running is allowed to be applied to the ignition coils 33 without being disturbed by the branch pipes 13, the ignition coils 33 are cooled effectively by the air so applied thereto, whereby an excessive increase in temperature of the ignition coils 33 can be prevented. Furthermore, since the ignition coils 33 are situated higher than the delivery pipe 41 in the direction of the axes of the cylinders, the ignition coils 33 are permitted to receive the air produced while the vehicle is running without being blocked by the delivery pipe 41, whereby the ignition coils 33 can be cooled effectively.

Since the ignition coils 33 are disposed by the one side of the primary linear portions 13a of the branch pipes 13 whose outside diameter in the cylinder arrangement direction A1 is made smaller, the total width of the ignition coil 33 and the branch pipe 13 in the cylinder arrangement direction A1 for each cylinder 2 becomes smaller, whereby the cylinder head 3 can be made compact in the cylinder arrangement direction A1.

The ignition coils 33 are disposed between the side wall 24c of the valve train chamber 24 and the curved portions 13b of the branch pipes 13 in the normal direction as viewed from the cylinder arrangement direction A1, and the couplers 33b which are disposed such that they do not overlap the branch pipes 13 as viewed from the attachment or detachment direction A2 of the ignition coils 33 to or from the spark plugs 30 are disposed such that they do not overlap the branch pipes 13, either, even as viewed from the a attachment or detachment direction A3 of the connecting terminals to or from the couplers 33b. Moreover, the ignition coils 33 are situated on the opposite side of the cylinder-head cover 4 to the side thereof where the mounting portions 33a are provided in the connecting terminals attachment or detachment direction A3. Thus, there is provided no disturbance by the branch pipes 13 and the cylinder-head cover 4 in attaching or detaching the connecting terminals to or from the couplers 33b, and hence the attachment or detachment of the connecting terminals to or from the couplers 33b can be facilitated, whereby the workability in attaching or detaching the ignition coils 33 to or from the connecting terminals can be improved when the ignition coils 33 need to be serviced. Moreover, the internal combustion engine E is installed on the front side of the vehicle with the couplers 33b being provided at the front of the ignition coils 33 in such a manner as to protrude forward to be moved away from the cylinder-head cover 4, as well as in such a manner that the insertion or removal of the connecting terminals can be implemented from the front. Thus, the workability in attaching or detaching the connecting terminals to or from the ignition coils 33 can further be improved.

In addition, since the mounting portions 33a are fastened to the mounting seats 4e having the threaded holes which are formed at the thick portion of the cylinder-head cover 4 to which the high rigidity is imparted, the ignition coils 33 can be rigidly fixed to the cylinder-head cover 4. Furthermore, since the mounting portions 33a which are disposed such that they do not overlap the branch pipes 13 as viewed from the ignition coils attachment or detachment direction A2 are clamped in the direction parallel to the attachment or detachment direction A2, the assembly or disassembly of the ignition coils 33 can be facilitated, and hence the workability in servicing the ignition coils 33 can also be improved in this respect.

An embodiment in which the construction of the afore said embodiment is partly modified will be described below, mainly on the modified construction.

While the branch pipes 13 are each constituted by the primary and secondary linear portions 13a, 13c and the curved portion 13b in the previous embodiment, the branch pipes 13 may be each constituted only by the curved portion 13b or by a combination of the curved portion 13b and the primary linear portion 13a or the curved portion 13b and the secondary linear portion 13c. Then, in a case where the primary linear portion 13a is not provided, the outside diameter in the cylinder arrangement direction A1 of the portion of the branch pipe 13 which is contiguous with the ignition coil 33 in the cylinder arrangement direction A1 is made smaller at the curved portion 13b than the other portions of the branch pipe 13.

While there are provided one intake valve port 7a and one exhaust valve port 8a for each cylinder 2 in the previous embodiment, there may be provided two intake valve ports and two exhaust valve ports for each cylinder which are opened and closed by a pair of intake valves and a pair of exhaust valves, respectively.

While the branch pipes 13 are provided independently for each cylinder 2 in the previous embodiment, the branch pipes may be constructed such that the primary linear portions for the two cylinders which are contiguous with each other in the cylinder arrangement direction A1 are constituted by a single common pipe, which is then bifurcated from the curved portion toward the downstream side of the branch pipe. Furthermore, the branch pipes may be constructed such that the respective primary linear portions for the two contiguous cylinders connect to the air collecting tube at different positions in the direction of the axes L1 of the cylinders (or in the vertical direction) so that those primary linear portions look overlapped as viewed from the cylinder arrangement direction A1. The overall width in the cylinder arrangement direction A1 of the ignition coils and the branch pipes which are disposed contiguous with the ignition coils in the cylinder arrangement direction A1 may be made smaller through the constructions described above, whereby not only can the internal combustion engine E be made compact but also the degree of freedom in layout of components mounted on the internal combustion engine E can be increased. On top of that, the intervals at which the ignition coils 33 and the branch pipes are arranged in the cylinder arrangement direction A1 can be made wider, whereby the workability in servicing the ignition coils can further be improved.

What is claimed is:

1. A multi-cylinder internal combustion engine comprising:
    a cylinder head attached to a top of a cylinder block in which a plurality of cylinders are formed;
    a cylinder-head cover attached to a top of said cylinder head;
    an intake manifold having a plurality of branch pipes connected to one side of said cylinder head and curved on said one side of said cylinder head so as to allow said intake manifold to extend to directly above said cylinder-head cover;
    a valve train chamber formed by said cylinder head and said cylinder-head cover;
    spark plugs and fuel injectors respectively incorporated in said cylinder head;
    ignition coils respectively provided above said spark plugs,
    wherein said spark plugs are disposed outside said valve train chamber on a side of said valve train chamber where curved portions of said plurality of branch pipes are disposed, and
    further wherein said fuel injectors and said ignition coils are disposed between said valve train chamber and said curved portions of said plurality of branch pipes in a direction normal to axes of said cylinders as viewed from a direction in which said cylinders are arranged.

2. The multi-cylinder internal combustion engine as set forth in claim 1, wherein said ignition coils are disposed separate from said branch pipes respectively as viewed in a direction in which said ignition coils are attached to or detached from said cylinder head.

3. The multi-cylinder internal combustion engine as set forth in claim 1, wherein said ignition coils are disposed, respectively, on one side of portions of said branch pipes whose outside diameters in said direction in which said cylinders are arranged are made smaller.

4. The multi-cylinder internal combustion engine as set forth in claim 1, wherein said ignition coils each have a mounting portion to said cylinder-head cover and a connecting portion where a connecting terminal is connected for supplying electric current, and further wherein said connecting portion is disposed separate from said branch pipe as viewed in a direction in which said connecting terminal is attached to or detached from said cylinder-head cover and is located on an opposite side of said ignition coil to a side thereof where said mounting portion is provided as viewed in said direction in which said connecting terminal is attached to or detached from said cylinder-head cover.

5. The multi-cylinder internal combustion engine as set forth in claim 4, wherein said mounting portion of said ignition coil is fixed to a mounting seat formed at a thick portion of said cylinder-head cover, and wherein said mounting portions are disposed separate from said branch pipes respectively as viewed in a direction in which said ignition coils are attached to or detached from said cylinder head.

6. The multi-cylinder internal combustion engine as set forth in claim 1, wherein said fuel injectors are inclined toward said curved portions of said branch pipes at an inclination angle with respect to the axial direction of said cylinder, which is greater than that of said ignition coils.

7. The multi-cylinder internal combustion engine as set forth in claim 1, further comprising:

a delivery pipe connected to the respective tops of said fuel injectors, wherein said ignition coils are situated higher than said delivery pipe in the axial direction of said cylinders.

* * * * *